(12) United States Patent
Rodriguez

(10) Patent No.: US 7,723,253 B2
(45) Date of Patent: May 25, 2010

(54) METHOD FOR PREPARING A COMPOSITION FOR CONTROL OF MICROBIAL CONTAMINATION IN DRINKING WATER

(75) Inventor: Felix Rodriguez, Webster, TX (US)

(73) Assignee: Aquamaker LLC, Houston, TX (US)

( * ) Notice: Subject to any disclaimer, the term of this patent is extended or adjusted under 35 U.S.C. 154(b) by 261 days.

(21) Appl. No.: 11/772,647

(22) Filed: Jul. 2, 2007

(65) Prior Publication Data

US 2008/0006582 A1 Jan. 10, 2008

Related U.S. Application Data

(63) Continuation-in-part of application No. 10/684,185, filed on Oct. 12, 2003, now abandoned.

(51) Int. Cl.
*A61K 33/30* (2006.01)
(52) U.S. Cl. .................... 502/85; 424/641; 210/501; 210/764
(58) Field of Classification Search ............... 424/641; 502/60, 85, 407, 414; 210/501, 502.1, 673, 210/660, 670, 764
See application file for complete search history.

(56) References Cited

U.S. PATENT DOCUMENTS

| | | | |
|---|---|---|---|
| 2,004,257 A | 6/1935 | Tschimer | |
| 2,595,290 A | 5/1952 | Quinn | |
| 3,242,073 A | 3/1966 | Guebert et al. | |
| 3,268,444 A | 8/1966 | Renn | |
| 3,585,130 A | 6/1971 | Gregory | |
| 4,198,296 A | 4/1980 | Doumas et al. | |
| 4,247,524 A | 1/1981 | Leonard | |
| 4,525,410 A | 6/1985 | Hagiwara et al. | |
| 4,938,958 A * | 7/1990 | Niira et al. | 424/78.1 |
| 5,151,122 A | 9/1992 | Atsumi et al. | |
| 5,320,773 A | 6/1994 | Perman et al. | |
| 5,531,908 A | 7/1996 | Matsumoto et al. | |
| 5,553,459 A | 9/1996 | Harrison | |
| 5,601,798 A | 2/1997 | Cooper et al. | |
| 5,669,221 A | 9/1997 | LeBleu et al. | |
| 5,845,504 A | 12/1998 | LeBleu | |
| 5,961,843 A | 10/1999 | Hayakawa et al. | |
| 6,207,060 B1 | 3/2001 | McKay | |
| 6,357,678 B1 | 3/2002 | Hu et al. | |
| 7,052,600 B2 | 5/2006 | McKay | |
| 7,476,311 B2 * | 1/2009 | Litz et al. | 210/88 |

\* cited by examiner

*Primary Examiner*—Matthew O Savage
(74) *Attorney, Agent, or Firm*—Locke Lord Bissell & Liddell

(57) ABSTRACT

Disclosed is a method and composition useful for controlling microbial contamination in drinking water produced from condensation. The composition comprises a zeolite which is modified to introduce zinc by ion exchange. The method comprises passing drinking water produced from condensation through a column packed with the modified zeolite.

8 Claims, 2 Drawing Sheets

METHOD FOR PREPARING A COMPOSITION FOR CONTROL OF MICROBIAL CONTAMINATION IN DRINKING WATER

This application is a continuation-in-part of U.S. patent application Ser. No. 10/684,185, filed Oct. 12, 2003, now abandoned.

FIELD OF THE INVENTION

The present invention relates to methods for preparing compositions and their use for the treatment of drinking water collected from condensation so as to reduce the microbial contamination while preserving the potability of the water. More specifically, a simple, inexpensive method is provided for making the composing and its use for reducing microbial contamination of drinking water produced from condensation which preserves the taste and potablilty of the water while being capable of simple unattended operation.

BACKGROUND OF THE INVENTION

Methods of producing high quality drinking water in a portable unit by condensation of dew from ambient air are well known in the art. For example, U.S. Pat. No. 5,669,221 issued to LeBleu et al on Sep. 23, 1997 and U.S. Pat. No. 5,845,504 issued to LeBleu on Dec. 8, 1998 teach a portable non-attended potable water generator enclosed in a decorative case. U.S. Pat. No. 5,553,459 issued to Harrison on Sep. 10, 1996 similarly teaches a water making apparatus which produces potable water from the moisture in atmospheric air.

One of the more troubling problems with producing high quality drinking water from condensation, yet one of the most important, concerns the control of microbial contamination. Without satisfactory disinfection of drinking water numerous problems can result. For example, the typhoid and cholera epidemics which were common throughout American cities in the last century were caused by poor disinfection. EPA's Science Advisory Board concluded in 1990 that exposure to microbial contaminants such as bacteria, viruses, and protozoa (e.g., *Giardia lamblia* and Cryptosporidium) was likely the greatest remaining health risk management challenge for drinking water suppliers.

It has also been recently learned that there are specific microbial pathogens, such as Cryptosporidium, that are highly resistant to traditional disinfection practices. In 1993, Cryptosporidium caused 400,000 people in Milwaukee to experience intestinal illness. More than 4,000 were hospitalized, and at least 50 deaths have been attributed to the disease. There have also been cryptosporidiosis outbreaks in Nevada, Oregon, and Georgia over the past several years. Because of these problems disinfection has long been recognized as an essential part of the art of producing drinking water.

There are currently two main commercial ways of treating microbial contamination in drinking water.

Chlorine is the standard form of treatment used in municipal systems. However, chlorine is a toxic substance and must be used under strict controls which would be difficult to implement in a portable, non-attended device. It also imparts a bad taste to water, and can react with naturally-occurring materials in the water to form unintended organic and inorganic byproducts which may pose health risks. Stronger oxidizing agents than chlorine can also be used such as ozone or iodine, but these are also difficult to implement, may impart bad tastes, and can cause the formation of halogenated organics.

Ultraviolet (UV) lights have become the main treatment method for rural residential and commercial systems, and the previously referenced patents to LeBleu and Harrison teach the control of microbial contamination in water collected from condensation by employing a bacteriostatic loop employing UV light. UV light has a number of practical difficulties, however, such as the difficulty of determining the correct size of the UV light and problems associated with contamination. Levels of hardness, iron, manganese, humic and fumic acid, tannins and other materials must be minimal to avoid staining on the lamp's internal sleeve which can shield bacteria from the UV rays. Most importantly, UV lights have been found in practice to be ineffectual for use with water produced from condensation. Although the failure mechanism is not precisely known, it is perhaps because the pathogens involved are dissimilar from those found in natural water where UV light has been found to be more effective.

In addition to the methods of disinfection which rely on chlorine or UV light, a number of other methods of disinfection have been proposed. The use of filtration has been proposed, as discussed in U.S. Pat. No. 3,242,073, although this would not be practical in an unattended device.

The use of electrical water purification using an ionization chamber or chambers and electrodes of various alloys, including silver and copper, has been proposed to control algae and bacteria. Prior patents dealing with the problem of electrical water purification include U.S. Pat. No. 4,525,253 issued to Hayes et al on Jun. 25, 1985. Hayes et al teaches the use of electrodes of a copper/silver/nickel alloy. The reference, which is contemplated mainly for swimming pools and other outdoor water storage areas, is directed to removal of algae and bacteria without the use of chlorine; however, the presence of silver in drinking water may lead to health problems. Like the previous Hayes et al reference, U.S. Pat. No. 4,680,114 issued to Hayes on Jul. 14, 1987 and U.S. Pat. No. 6,207,060 issued to McKay on Mar. 27, 2001 teach the use of silver and copper/silver alloyed electrodes, or copper or zinc electrodes. U.S. Pat. Nos. 4,263,114 and 4,328,084 issued to Shindell disclose the use of electrodes to destroy organic matter, especially in swimming pools and spas. However, the addition of excess sodium to drinking water may be detrimental to human health.

Treatment of household drinking water by passing the water through a bed of activated charcoal impregnated with or having oligodynamic silver or other bactericide adsorbed thereon is known from the prior art. For example, U.S. Pat. No. 2,595,290, patented May 6, 1952, U.S. Pat. No. 3,242,073 patented Mar. 22, 1966, U.S. Pat. No. 3,268,444, patented Aug. 27, 1968, U.S. Pat. No. 3,585,130, patented Jun. 15, 1971, and the references cited therein. In addition, the United States National Aeronautics and Space Administration (NASA) has conducted experiments and constructed apparatus for treating spacecraft water with silver ions for biocidal and virucidal purposes. Reference to this work is cited in U.S. Pat. No. 4,198,296, and teach the biocidal virucidal effects of silver ions in a very pure distilled or deionized water.

There is a need for a simple, inexpensive method and composition for reducing microbial contamination of drinking water produced from condensation. Such should preserve the taste and quality of the water while being inexpensive and capable of simple, unattended operation.

SUMMARY OF THE INVENTION

It is an object of the present invention to provide a method and composition which simply and inexpensively reduces the microbial contamination of drinking water produced from condensation while preserving the taste and quality of the water. The apparatus produces biologically safe and palatable drinking water from condensate by contacting the water with a biocide in an apparatus designed to reduce contamination to acceptable levels. The biocide is a disinfectant composition made from a zeolite which is subjected to low and high PH and slow drying process in which a comparatively large amount of antibacterial metal or metal salt is retained by absorption. By this modification to produce a material capable of controlled the release of zinc ions into the water.

BRIEF DESCRIPTION OF THE DRAWINGS

While the specification concludes with claims particularly pointing out and distinctly claiming the invention, it is believed that the present invention will be better understood from the following description taken in conjunction with the accompanying drawing in which:

DETAILED DESCRIPTION OF THE PREFERRED EMBODIMENTS

While this invention may be embodied in many different forms, there are described in detail herein specific preferred embodiments of the invention. The descriptions are an exemplification of the principles of the invention and are not intended to limit the invention to the particular embodiments illustrated.

Figure 1:
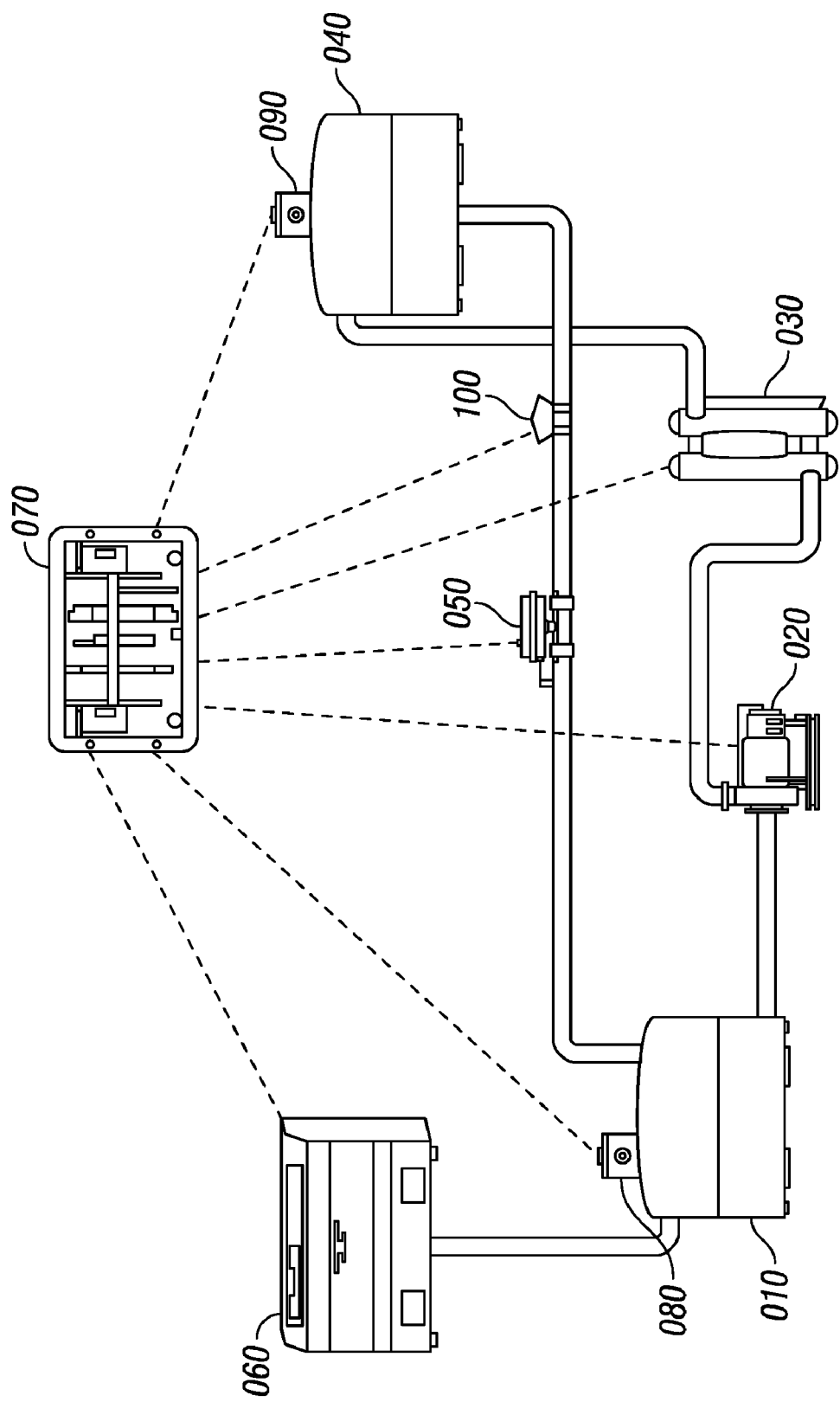
FIG. 1 is a diagrammatic view illustrating the flow process of an apparatus in accordance with the teaching of the invention.

With reference to the drawings, FIG. 1 illustrates a general schematic illustration of one embodiment of the instant invention consisting of a closed loop water treating system which includes a dehumidifier 060 which produces water from condensation of air which is collected in a bottom tank 010. When the bottom tank 010 is full, the magnetic level control 080 will send a signal to the microprocessor 070 which in turn will send a signal to activate the pump 020. From the bottom tank 010 the water is pumped thru the biocide 030 and then the water is delivered to the top holding tank 040. A level control 090 will detect when the tank 040 is full, whereupon the level control 090 will send a signal to the microprocessor 070 to stop the pump 020. The microprocessor 070 sends a signal every six hours to the recycling valve 050 to recycle the water from the top holding tank 040 to the bottom tank 010 to prevent growth of bacteria in the water. The conductivity sensor 100 may be any commercially available device well known in the art which measures the conductivity of the water such that if the quality of the water changes, the output of the conductivity sensor 100 will change, and the microprocessor 070 will detect the change in the conductivity sensor 100 and will stop the pump 020 and send an alarm signifying that the quality of the water may not be safe for consumption.

Description of the Biocide

In a preferred embodiment of the present invention the biocide consists of a zeolite which is specially treated to induce biological activity, as described below.

The zeolite can be any zeolite selected from among those which are well known in the art. In a preferred embodiment the zeolite is clinoptilolite, a naturally occurring volcanic mineral, which is a hydrated alummino-allicate with infinite three-dimensional frameworks of silicon-oxygen ($SiO_4$) tetrahedra. The material is available from Bompahi Mexico City mined at a deposit in Coahuila Mexico. The zeolite contained in the mineral is a clinoplilolite-heulandite, hydrated aluminum silicate which chemical crytolilote composition is $(Na_{1.84}K_{1.76}Mg_{0.2}Ca_{1.24})(Si2_{9.84}Al_{6.16}O_{72}{}^{+})21.36\ H_2O$ Mineralogical composition: Ca—K—Na-hydrated alumino silicate Mineralogical analysis (XRD)

Clinoptilolite min. 75%

(Calcium-Potassium-Sodium type, Si/Al 5.4) with minor feldspar (5%) and montmorillonite (4%)

Pore volume: 0.34 $cm^3/cm^3$

1 Physical properties (typical) Specific density 1.4-1.6 $g/cm^3$ Bulk density 0.6-0.8 $g/cm^3$ Hardness 3.5-4 (Mohs scale) Alkaly stability 7-11 PH Acid stability 7 PH Moisture content <2 Absorbing gases $NH_3$, $H_2S$ Colour Greenish, Gray Preparation and Activation Screening In a preferred embodiment the zeolite is first screened to produce a desired particle size. In one embodiment particle sizes of less than 0.091 mm are selected. In another embodiment particle sizes of between 1 and 3 mm are selected. In yet another embodiment particle sizes of 3 to 10 mm are selected.

Purification

In one embodiment following screening the zeolite is purified by washing with high-quality hydrochloric acid for the regeneration of ion_exchange and to remove $Na^+$ and $Ca^{2+}$ a solution was prepared by diluting 125 ml of 30% HCL on a 8 liter of distilled water at a room temperature the solution was added to a 320 oz of zeolite creating a slurry this slurry was placed in side of a oven at from 90 to 200 degree C. for drying.

Activation

In a preferred embodiment the zeolite is activated by a solution prepared by diluting 2 ml sulphuric acid, $H_2SO_4$ in to 2 liters of water lowering the PH 2 adding the solution 6 oz of $ZnSO_4\ 7H_2O$. Three hundred and twenty (320) oz of zeolite this solution was added and mixed for 10 minutes and place in a drying oven for 4 hours or until the zeolite is complete dry. After the zeolite is dry a solution 20 ml Sodium hydroxide (NaOH) in to 2 liter of distiller water at PH of 11 was added to the 320 oz of zeolite and mixed for 10 minutes and place in the oven for 4 hours or until the zeolite is complete dry. This modification which imparts zinc ions into the structure of the zeolite. In one embodiment the previously described clinoptilolite is treated for a period sufficient to incorporate sufficient zinc into the clinoptilolite. The actual concentration of $ZnSO_4.7H_2O$ is selected from within the range of 1 to 10% by weight of $ZnSO_4.H20$ so as to be sufficient to impart the desired biological activity. The present invention is to provide an antibacterial zeolite material in which an antibacterial metal or metal ion will not elute into any contacting medium whatsoever, as a result of which the material exhibits superior antibacterial property safely and for an extended unknown period of time.

Ion Exchange Properties

A chemical analysis showed that zinc in the clinoptilolite will exchanges with calcium $Ca^{2+}$ even though the selectivity of this zeolite is lower for zinc ions. However, the lowering the PH to 1-3 at first step and increasing the PH 9-11 at the end at this conditions established for the exchange reaction increase the adsorption of the metal zinc in to the clinoptilolite structure.

The release of Zn from the biocide was studied in two different systems: 1) a drinking water system, and 2) a NaCl (0.9%) dissolution (PH 5.8) to approach a simple biological media.

Figure 2:
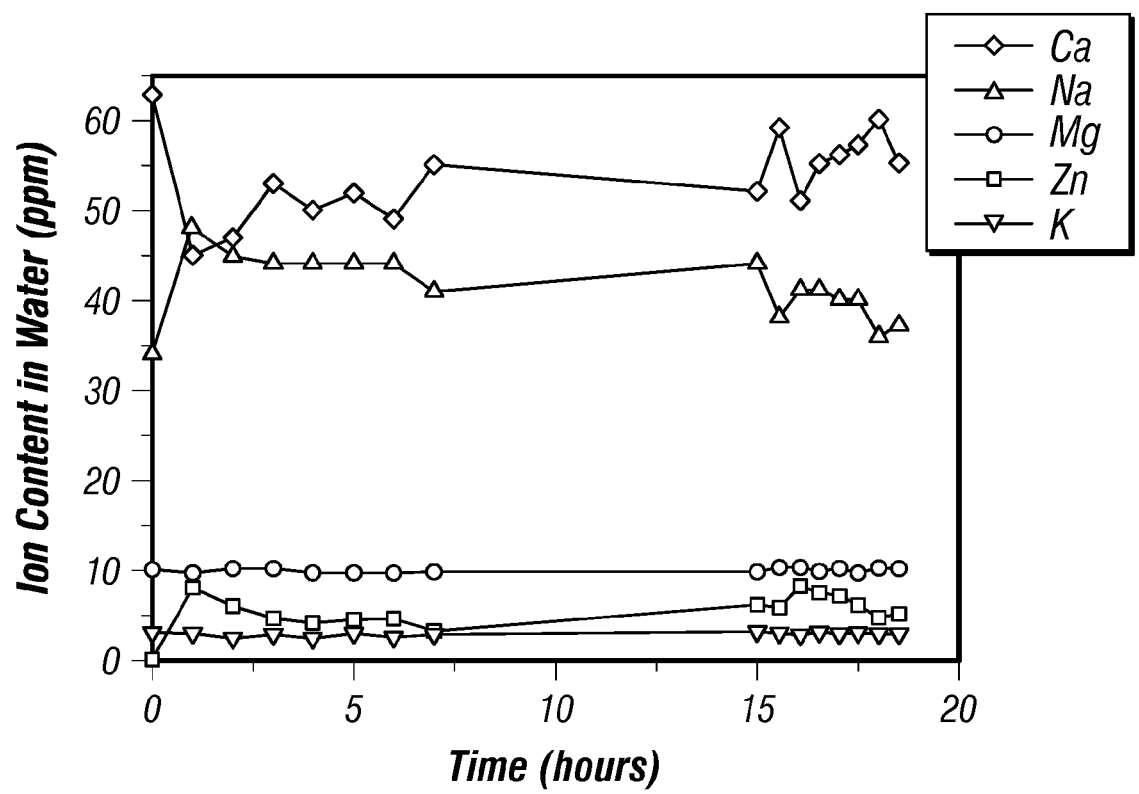
FIG. 2 shows the performance of the ion exchange process.

FIG. 2 shows the measured performance of the different cat ions in the exchange process of the biocide when the biocide was placed in a column containing a 20-cm-long bed of biocide, with diameter of 2 cm, and drinking water was passed through. The ion exchange study showed that Zn2+ ions are mainly exchanged from the biocide by Ca2+ and in lower proportion by Na+ ions present in water. The amount of Zn released from the clinoptilolite structure to the drinking water was lower than 10 ppm, which meets the typical requirement for drinking water. This Zinc content suffices to produce a bactericide effect.

An exchange study using a NaCl dissolution demonstrated that it is the clinoptinolite that controls the release of Zn ions from the biocide. FIG. 2 shows the plot of Zinc content in the NaCl dissolution vs. exchange time after the contact between the biocide and NaCl dissolution and the velocity of Zn ions release from the biocide. The plotting was adjusted to the Higuchi model confirming the controlled released of Zn ions by the zeolitic material.

Biological Properties

A study was conducted using the biocide of the instant invention. Table 1 shows the results of a microbiological test conducted using drinking water—without chlorine—contaminated with *Escherichia coli* ATCC 25922. Notice how the number of colony unit formation was reduced within the first 2 to 5 hours of contact with the biocide and without stirring the system. A comparison of the biocide and chlorination treatments showed that the biocide is equally effective for the elimination of microbiological contamination.

TABLE 1

Bactericide effect of biocide of instant invention against *Escherichia coli* ATCC 25922 in drinking water
COLONY UNIT FORMATION

| Time [hours] | Biocide [0%] | Biocide [5%] | Biocide [10%] |
|---|---|---|---|
| 0 | 81 × 103 | 1 × 102 | 5 × 10 |
| 2 | 10 × 103 | 8 × 10 | 5 × 10 |
| 5 | 29 × 103 | 10 | 5 |
| 24 | 71 × 103 | 80 | 10 |
| 48 | 92 × 103 | 89 × 102 | 3 × 102 |

CONCLUSIONS

The results obtained in all the studies lead to the main conclusion that the instant invention provides a controlled release of zinc ions to the biological media and water, and has the desired disinfectant result. A chemical analysis of the activated clinoptilolite indicates that zinc exchanges with the naturally occurring calcium even though the selectivity is lower for the zinc ions.

Experimental Analysis

An evaluation of the invention was performed to test its effectiveness and efficiency by installation on a commercially available unit, a Model No. LA1 available from Liquid Air, 249 E. Ocean Blvd., Ste. 1010, Long Beach, Calif. 90802. The tested unit consists of a portable, potable-water generator for producing high-purity liquid water by condensation of dew from ambient air. An enclosed heat absorber cools the filtered air below its dew point and collects droplets of condensate into a closed system. The collected liquid dew is further treated in a bacteriostatic loop consisting of a UV light to destroy living organisms followed by a carbon filter and 1 micron filter. The water is recycled through the bacteriostatic loop every 3 hours.

EXAMPLE 1

The test unit equipped with the standard UV light system followed by a carbon filter and 1 micron filter was placed in an environment simulating that of a typical home and observed for a period of time, with the following results.

Mar. 27, 2003: Unit placed in service.
Mar. 16, 2003: Water tanks observed to be contaminated with slime and algae. Unit replaced.
May 21, 2003: Water tanks again contaminated with slime and algae. Unit replaced.
Jun. 23, 2003: Water tanks again contaminated with slime and algae. Unit replaced.
Jun. 30, 2003: Test unit was modified to include the present invention in place of the UV light, Carbon filter and 1 micron filter, (the UV light, Carbon filter, and 1 micron filter were removed) and the system was placed in service in the same environment, with the following results:

No slime or algae was observed and the following measurements were obtained:

| DATE | HETEROTROPHIC PLATE COUNT |
|---|---|
| Jul. 3, 2003 | NA |
| Jul. 7, 2003 | NA |
| Jul. 8, 2003 | NA |
| Aug. 4, 2003 | NA |
| Aug. 5, 2003 | 2 |
| Aug. 11, 2003 | 5 |
| Aug. 25, 2003 | 7 |
| Sep. 15, 2003 | 1 |

EXAMPLE 2

A test unit similar to that described in Example 1 equipped with the standard UV light, carbon filter and 1 micron filter was placed in a typical office environment (temperature 74 to 78 degrees F., humidity 44 to 56%). The unit was placed in service on Jun. 28, 2003 with the following results:

| DATE | HETEROTROPHIC PLATE COUNT |
|---|---|
| Jul. 3, 2003 | 108000 |
| Jul. 8, 2003 | 32000 |
| Jul. 8, 2003 | 35680 |

The test unit was modified to include the present invention in place of the UV light system, carbon filter, and 1 micron filter, and the unit was returned to the same typical office environment (temperature 74 to 78 degrees F., humidity 44 to 56%, with the following results

| DATE | HETEROTROPHIC PLATE COUNT |
|---|---|
| Aug. 4, 2003 | 46 |
| Aug. 5, 2003 | NA |
| Aug. 11, 2003 | 25 |

-continued

| DATE | HETEROTROPHIC PLATE COUNT |
|---|---|
| Aug. 25, 2003 | NA |
| Sep. 15, 2003 | NA |

While particular embodiments of the subject invention have been described, it will be obvious to those skilled in the art that various changes and modifications of the subject invention can be made without departing from the spirit and scope of the invention. It will be clear to those skilled in the art that various changes and modifications may be made without departing from the scope of the invention and the invention is not to be considered limited to the embodiments and examples that are described in the specification.

What is claimed:

1. A method of preparing a composition for controlling the microbial contamination of drinking water produced by condensation comprising:
   (a) washing a zeolite with an acidic solution containing water and an acid;
   (b) slow drying the zeolite from step (a);
   (c) mixing the zeolite from step (b) with a solution containing water and a zinc compound;
   (d) drying the zeolite from step (c);
   (e) mixing the zeolite from step (d) with a basic solution containing water and a base, said basic solution having a pH between about 10 and 11; and
   (f) drying the zeolite from step (e) to form said composition.

2. The method of claim 1, wherein the said zeolite is a clinoptilolite.

3. The method of claim 2, further comprising the step of sizing the clinoptilolite to with the range of about 1 to about 10 mm.

4. The method of claim 3, wherein the acidic solution of step (a) is formed by mixing 30% hydrochloric acid with water.

5. The method of claim 1, wherein the slow drying in Step (b) is for about 4 hours.

6. The method of claim 1, wherein the zinc compound is zinc sulfate.

7. The method of claim 1, wherein the zinc compound is $ZnSO_4 \cdot 7H_2O$.

8. The method of claim 7, wherein the concentration of the solution of water and $ZnSO_4 \cdot 7H_2O$ is in the range of about 1 to about 10 percent by weight $ZnSO_4 \cdot 7H_2O$.

* * * * *